(12) United States Patent
Cain et al.

(10) Patent No.: US 6,198,607 B1
(45) Date of Patent: Mar. 6, 2001

(54) CONTACT PLANAR MAGNETORESISTIVE HEAD

(75) Inventors: William C. Cain; Michael E. Devillier, both of San Jose; Harold J. Hamilton, Santa Clara; Robert D. Hempstead; Darren T. Imai, both of Los Gatos; Dimitre A. Latev, San Jose, all of CA (US)

(73) Assignee: Censtor Corporation, San Jose, CA (US)

( * ) Notice: Subject to any disclaimer, the term of this patent is extended or adjusted under 35 U.S.C. 154(b) by 0 days.

(21) Appl. No.: 08/725,296

(22) Filed: Oct. 2, 1996

Related U.S. Application Data

(63) Continuation-in-part of application No. 08/673,281, filed on Jun. 28, 1996, now abandoned, and a continuation-in-part of application No. 08/577,493, filed on Dec. 22, 1995.

(51) Int. Cl.$^7$ ...................................................... G11B 5/39
(52) U.S. Cl. ................................... 360/318.1; 360/246.1; 360/246.2
(58) Field of Search ..................................... 360/113, 103, 360/104, 122, 125, 126, 97.01, 97.02, 234.7, 234.8, 234.9, 237.1, 318.1, 246.1, 246.2

(56) References Cited

U.S. PATENT DOCUMENTS

| | | | |
|---|---|---|---|
| 3,417,465 | * 12/1968 | Glass | 360/126 X |
| 4,164,770 | * 8/1979 | Jeffers | 360/113 |
| 4,413,296 | * 11/1983 | Jeffers | 360/113 |
| 4,423,450 | 12/1983 | Hamilton | 360/111 |
| 4,819,091 | * 4/1989 | Brezoczky et al. | 360/97.01 |
| 4,949,207 | * 8/1990 | Lazzari | 360/126 X |
| 5,278,711 | * 1/1994 | Gregory et al. | 360/103 |
| 5,408,373 | * 4/1995 | Bajorek et al. | 360/126 X |
| 5,557,488 | * 9/1996 | Hamilton et al. | 360/237.1 |
| 5,560,097 | * 10/1996 | Bajhorek et al. | 360/113 X |
| 5,648,884 | * 7/1997 | Lazzari | 360/113 |

OTHER PUBLICATIONS

Daniel Chapman, "A New Approach To Making Thin Film Head–Slider Devices", IEEE Transactions On Magnetics, vol. 25, No. 5, pp. 3686–3688, Sep. 1989.*

* cited by examiner

Primary Examiner—William R. Korzuch
(74) Attorney, Agent, or Firm—Mark Lauer

(57) ABSTRACT

A hard disk drive head operates in close proximity and dynamic contact with a rapidly spinning rigid disk surface, the head including a transducer with a magnetically permeable path between a poletip disposed adjacent to the disk surface and a magnetoresistive (MR) sensor situated outside the range of thermal noise generated by the surface contact. The magnetically permeable path is the same as that used to write data to the disk, eliminating errors that occur in conventional transducers having MR sensors at a separate location from the writing poletips. Moreover, the magnetically permeable path is preferably formed in a low profile, highly efficient "planar" loop that allows for manufacturing tolerances in throat height and wear of the terminal poletips from disk contact without poletip saturation or poletip smearing. The MR layer is formed in one of the first manufacturing steps atop the substrate, so that the MR layer has a relatively uniform planar template that is free from contaminants. A preferred embodiment has a laminated yoke for improved high frequency efficiency, with the MR element situated between the yoke lamina for improved sensitivity.

19 Claims, 8 Drawing Sheets

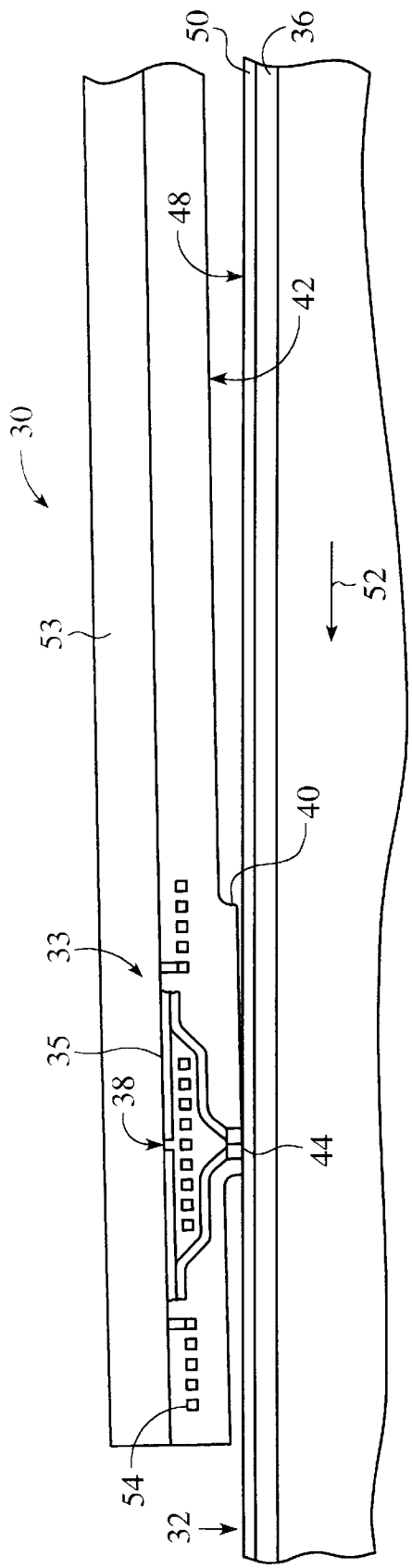
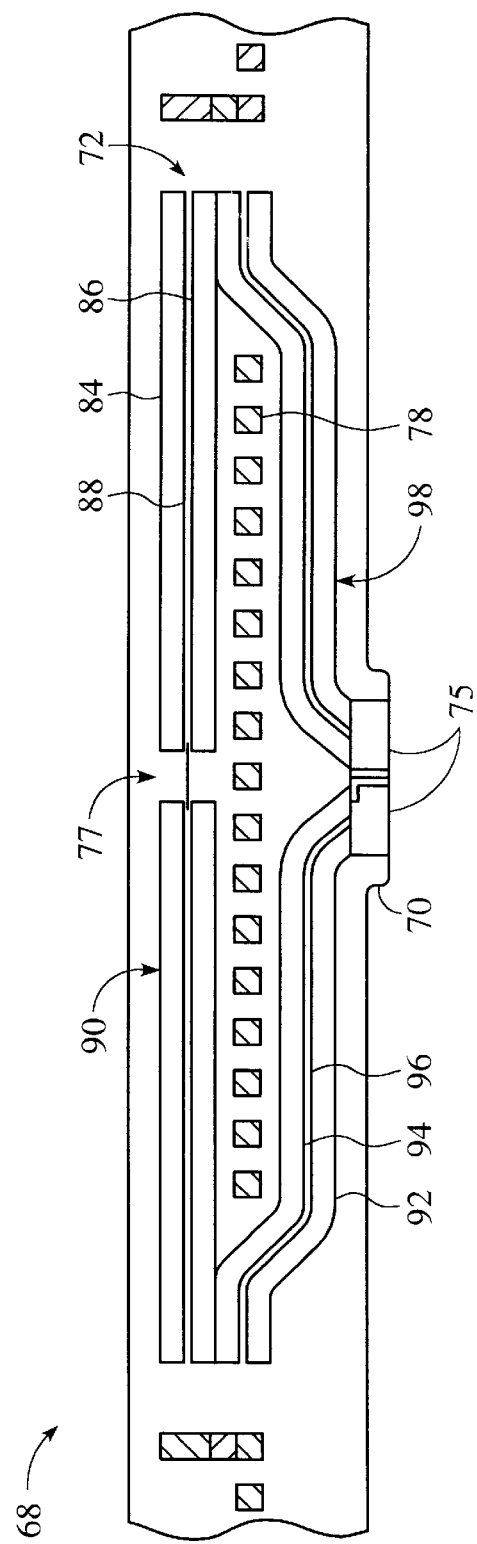

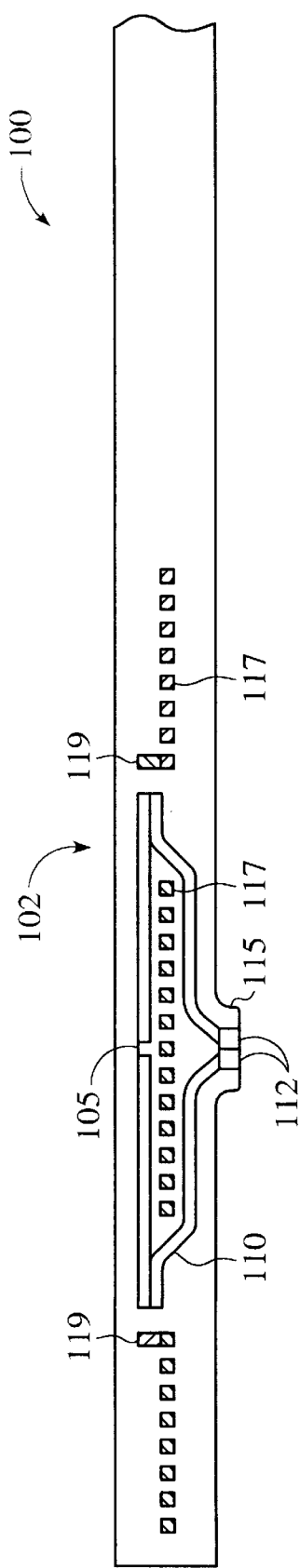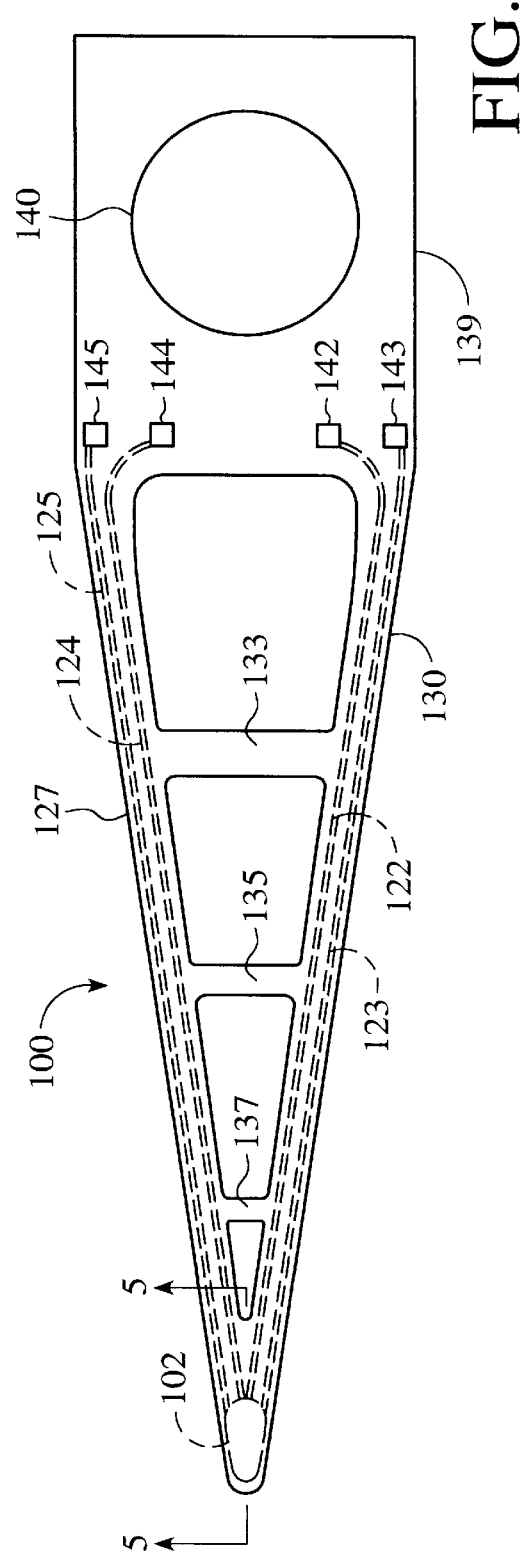

CONTACT PLANAR MAGNETORESISTIVE HEAD

CROSS-REFERENCE TO RELATED APPLICATIONS

This application is a continuation-in-part of U.S. patent application Ser. No. 08/673,281 entitled VIRTUAL CONTACT HARD DISK DRIVE WITH PLANAR TRANSDUCER, filed Jun. 28, 1996, now abandoned, and is also a continuation-in-part of U.S. patent application Ser. No. 08/577,493, still pending, entitled HARD DISK DRIVE HAVING RING HEAD SLIDING ON PERPENDICULAR MEDIA, filed Dec. 22, 1995. Both of these documents are incorporated by reference herein.

TECHNICAL FIELD

The present invention relates to information storage systems and in particular to electromagnetic transducers for hard disk drives.

BACKGROUND OF THE INVENTION

Traditional electromagnetic transducers employ a magnetically permeable core coupled with a conductive coil in order to write and read data in an associated magnetic recording surface. In a hard disk drive, such transducers are usually spaced from the rapidly spinning rigid disk by a thin layer of air that moves with the disk surface, often termed an air bearing. This spacing is believed to be important in avoiding damage between the rapidly spinning disk and the transducer, which is appended to a substrate designed to "fly" slightly above the disk surface, buoyed by the moving air layer. This spacing or fly height, however, limits the density with which data can be stored and lowers the resolution and amplitude with which data can be retrieved. In recent years, durable sliding contact operation has been achieved which removes the air layer spacing and thereby enhances resolution, as disclosed in commonly assigned U.S. Pat. No. 5,041,932 to Hamilton.

Writing is typically performed by applying a current to the coil so that a magnetic field is induced in the adjacent magnetically permeable core, with the core transmitting a magnetic signal across any spacing and protective coating of the disk to magnetize a tiny pattern, or bit, of the media layer within the disk. Reading of information in the disk is performed by sensing the change in magnetic field of the core as the transducer passes over the bits in the disk, the changing magnetic field inducing a voltage or current in the inductively coupled coil. Alternatively, reading of the information may be accomplished by the employment of a magnetoresistive (MR) sensor, which has a resistance that varies as a function of the magnetic field adjacent to the sensor. In order to increase the amplitude and resolution in reading the bits, the MR sensor is typically positioned on the slider as close to the disk as possible.

Such a conventional MR sensor is formed of a very thin film with an edge facing and designed to be aligned with the recorded bits, and is subject to deleterious influences other than the magnetic field of the nearby bits. During manufacture, for instance, minor imperfections in material purity or thickness of the film can result in intolerable variations in magnetoresistance. Similarly, as little as ten millionths of an inch of wear of the sensor due to occasional contact with the disk is enough to cause most currently available, high-density MR hard disk drives to fail. Moreover, fluctuations in the temperature of the sensor can cause changes in resistance that may be confused with magnetic signals. In particular, even occasional contact between the transducer and the disk is known to result in such thermal fluctuations. Differing approaches have been used to avoid such thermal asperities. In U.S. Pat. No. 5,255,141, Valstyn et al. remove an MR or Hall effect sensor from the disk-facing surface of a flying head by utilizing a shunt that is switched to allow sufficient signals for both writing and reading. On the other hand, U.S. Pat. No. 5,455,730 to Dovek et al. employs a thick lubricant and a step to maintain separation between an MR sensor and the disk, and uses electronic manipulation to filter out magnetic signals from thermal noise.

An object of the present invention was to provide extremely high signal resolution in a hard disk drive system by designing a transducer to combine dynamic contact operation and MR sensing while keeping the wear and thermal noise from such contact from destroying the transducer or overwhelming the signal resolution.

SUMMARY OF THE INVENTION

The above object has been achieved in a hard disk drive system having a head in close proximity and therefore frequently if not continuously contacting the rapidly spinning rigid disk surface, the head employing a transducer with a magnetically permeable path between a poletip adjacent the disk surface and an MR sensor situated outside the range of thermal noise generated by the surface contact. The magnetically permeable path is the same as that used to write data to the disk, eliminating errors that occur in prior art transducers having MR sensors at a separate location from the writing poletips. Moreover, the magnetically permeable path is preferably formed in a low profile, highly efficient "planar" loop that allows for manufacturing tolerances in throat height and wear of the terminal poletips from disk contact without poletip saturation or poletip smearing. Due to the high density and signal resolution afforded by such contact, sufficient signal is available for both writing and reading without the need for a shunt circuit.

In an ultralight, sliding contact embodiment, the transducer is formed primarily from a composite of thin-film layers with any bulk substrate removed. This transducer is designed to avoid flying and has such a low mass as to be insensitive to wear and shock. At least one disk-facing projection removes the vast majority of the transducer from the air that accompanies the spinning disk, reducing the lift felt by the transducer and allowing the projection to slide on the disk. In a somewhat larger partial or virtual contact embodiment, a substrate die remains attached to the thin-film layers on the side of the slider furthest from the disk, while the disk-facing layers are fashioned for an aerodynamic interaction with the moving air layer that causes the front of the slider to slightly raise while the rearward read/write poletips operate in virtual contact with the disk.

In either embodiment, the delicate MR layer is formed in one of the first manufacturing steps atop the substrate, so that the MR layer has a relatively uniform planar template that is free from contaminants. Forming the MR layer on such a flat, contaminate-free surface can dramatically increase the manufacturing yield. Also common to both the ultralight contact and the virtual contact embodiments is a low inductance, generally planar transducer that affords tolerance in throat height, both during manufacturing and later due to operational wear from contacting the disk. One embodiment of the planar transducer has a laminated yoke for improved high frequency efficiency, and the MR element in this case may be situated between the yoke lamina, which are also formed early in the process.

The shape of the MR layer is optimized for maximum efficiency and stability. Additional stability may be provided by exchange, permanent bias, end pinning or any other suitable stabilization device. The preferred means for linearizing the MR output signal, in order to distinguish the orientations of recorded bits, is by flowing the electric current in the MR element in a direction between parallel and perpendicular to the magnetic flux from a signal. This canted current flow may be achieved by defining conductors adjoining the MR element, and a stabilization layer may optionally first be deposited on the MR element. Other linearizing and stabilizing schemes may employ a soft adjacent underlayer (SAL), permanent magnet layer, end pinning or other devices. The poletips are formed last, allowing for careful tailoring and last-minute variations in track width and other specifications.

BRIEF DESCRIPTION OF THE DRAWINGS

FIG. 1 is a cross-sectional view of a virtual-contact, magnetoresistive-sensing head of the present invention.

FIG. 3 is a cross-sectional view of an ultralight-contact, magnetoresistive-sensing integrated flexure head of the present invention.

FIG. 5 is a cross-sectional view of an ultralight-contact, magnetoresistive-sensing integrated flexure head of the present invention.

FIG. 6 is a top view of the integrated head and flexure of FIG. 5.

DESCRIPTION OF THE PREFERRED EMBODIMENTS

Figure 2:
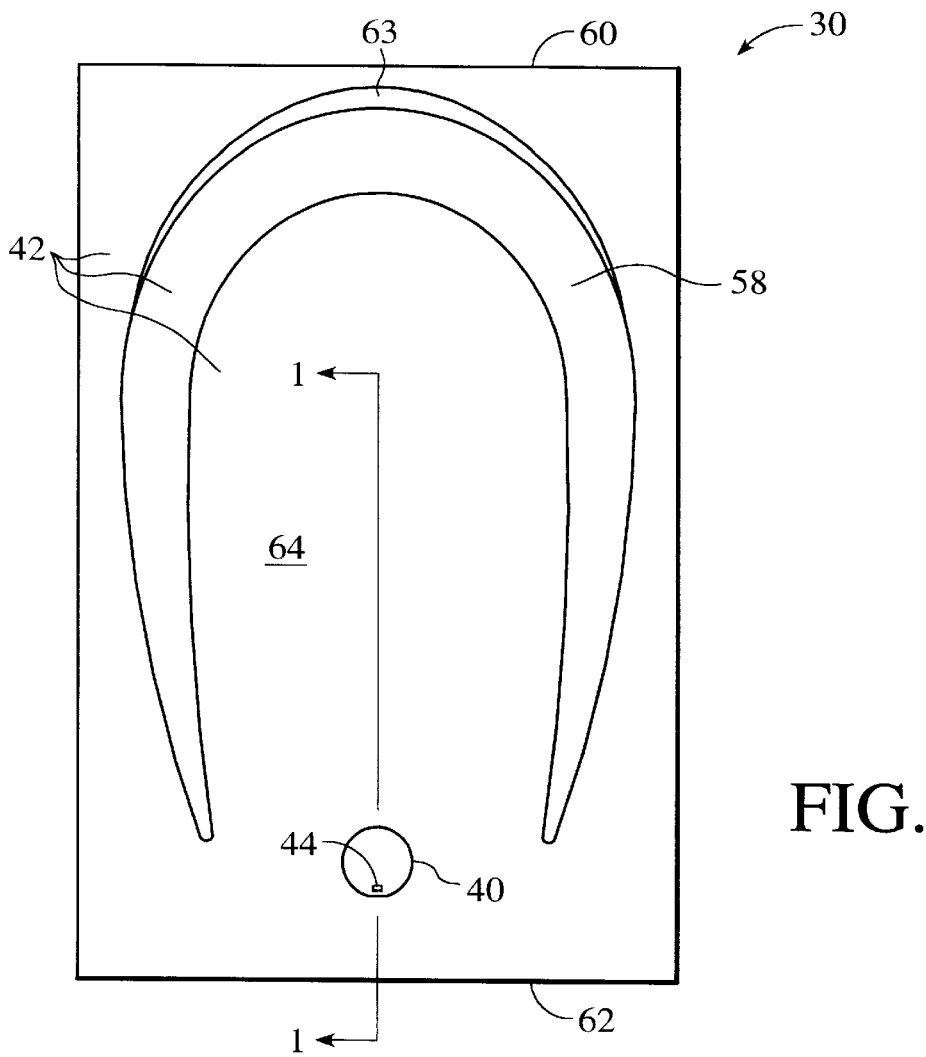
FIG. 2 is a bottom view of the disk-facing surface of the head of FIG. 1.

FIG. 1 shows a cross-section of a virtual contact head or slider 30 in operation reading or writing data on an adjacent rigid disk 32, while FIG. 2 shows a view of that head as seen from the disk. The arrows 1—1 in FIG. 2 indicate the cross sectional view of FIG. 1. The slider 30 has a transducer 33 with a magnetically permeable loop or core 35 which is used for both inductive writing and magnetoresistive (MR) reading of bits of data on a media layer 36 of the disk 32. An MR stripe 38 forms a small part of the loop 35 through which magnetic flux passes during both writing and reading. A projection 40 from a disk-facing surface 42 of the slider has a pair of poletips 44 which are exposed to a recording surface 48 of the disk 32. The projection 40, aside from the poletips 44, is composed essentially of diamond-like-carbon (DLC), which has a favorable tribological relationship with a carbon based layer 50 that overcoats the media layer 36 of the disk 32. The disk 32 spins relative to the head 30 in a direction shown by arrow 52 at a typical operational speed of several thousand RPM, generally between 2,000 and 10,000 RPM.

As will be described in more detail below, the head is constructed in a series of layers which will be mostly parallel to the disk surface 48 during operation, including in this embodiment a substrate 53 upon which the remainder of the layers are formed. The magnetically permeable core 35 is formed of several ribbon-like layers, which in this cross-sectional view are shaped similar to the body of a coat hanger, with the MR stripe 38 disposed near a center of the base and opposed to the poletips 44. A layer of coils 54 winds around the core 38 in a connected pair of spirals that induce a magnetic flux around the core during writing of signals, the coils provided with voltage through conductors that run along or through the substrate 53 at locations not shown in this cross-section. The flux travels across a gap between the poletips 44 and into the media 36 to magnetize bits of the media. During reading, the magnetic fields from the bits of media 36 cause a magnetic flux to flow around the core 35 including the MR stripe 38, which is connected by conductive leads to a circuit that senses a change in resistance of the stripe caused by the magnetic field in the core.

The disk-facing surface 42 has an air bearing projection 58 near the leading edge 60 that maintains that edge at a higher elevation from the disk 32 than the trailing edge 62. In front of the air bearing surface 58 is a shallow ramp or step 63 that provides an upward tilt to the slider during start up. Behind the U-shaped projection 58 is a recessed, negative pressure area 64 that adjoins the trailing, magnetically active projection 40. A balance between the downward forces provided by the negative pressure area 64 and the head suspension, and the upward forces provided by disk surface contact and the aerodynamic lift of the small projection 40, keep that projection and its exposed poletips 44 in virtual contact with the disk surface, allowing durable, high density data storage and retrieval. The proximity of the poletips to the magnetized bits of the disk allows sufficient signal to propagate around the core for sensing by the MR circuit, and the insulation of the MR stripe from thermal asperities generated by dynamic contact between the projection 40 and the disk 32 keeps noise generated by heat at a minimum.

Figure 4:
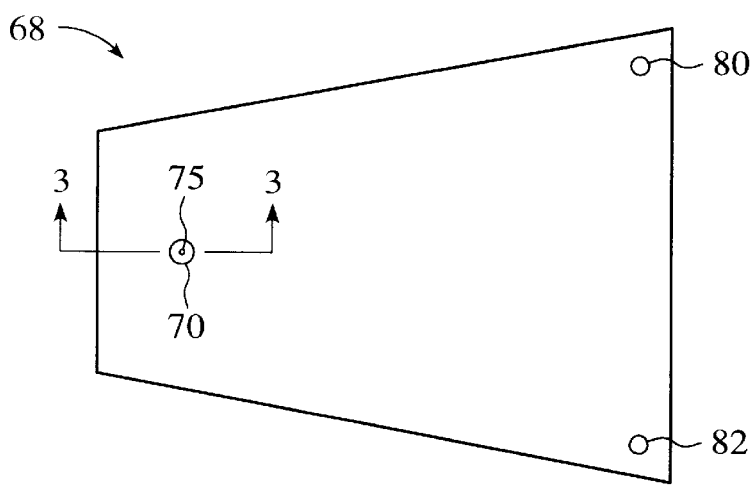
FIG. 4 is a bottom view of the disk-facing surface of the head of FIG. 3.
Figure 7:
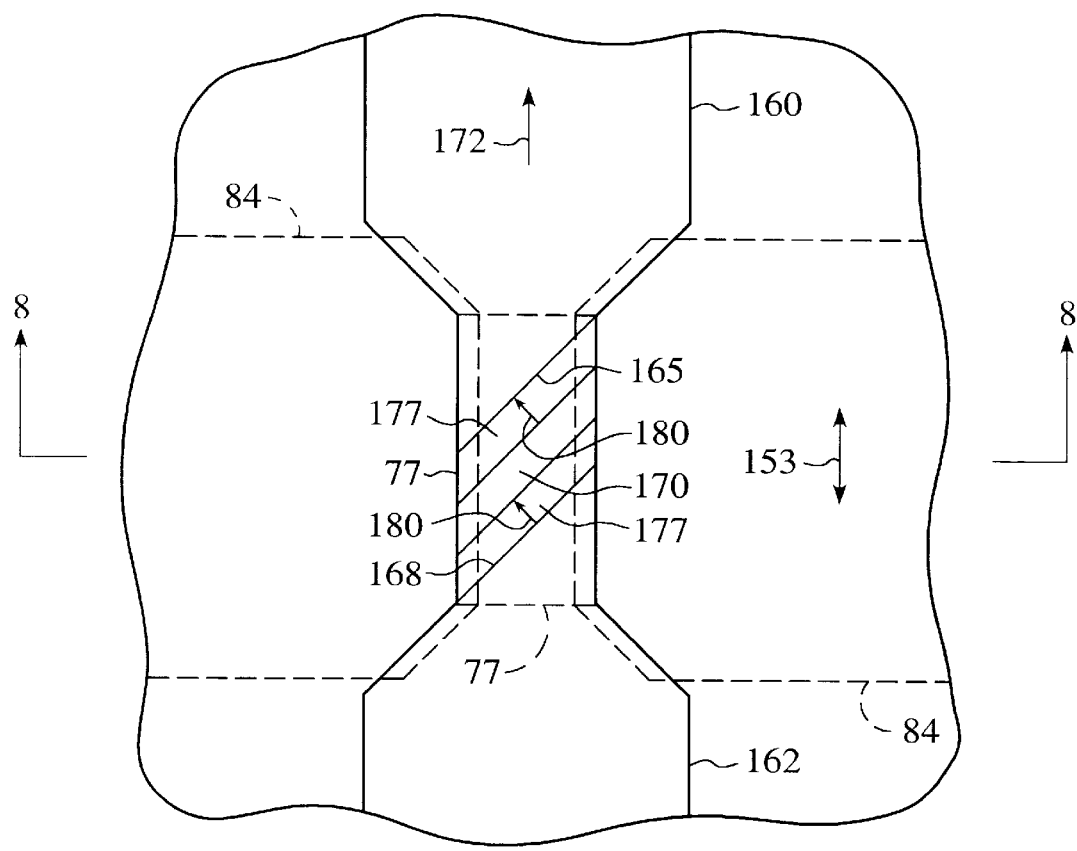
FIG. 7 is a top view of some initial steps in forming an MR sensor in a laminated yoke.
Figure 8:
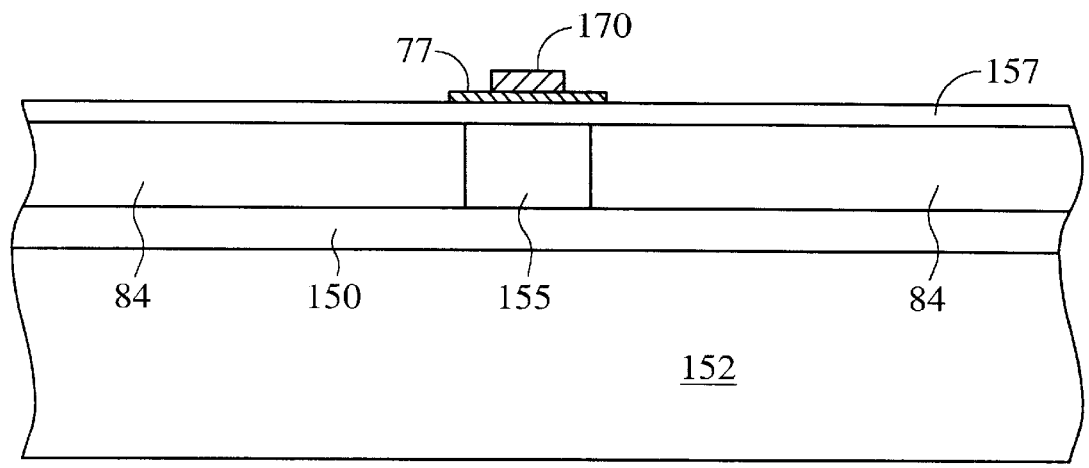
FIG. 8 is a cross-sectional view of the steps of FIG. 7.
Figure 9:
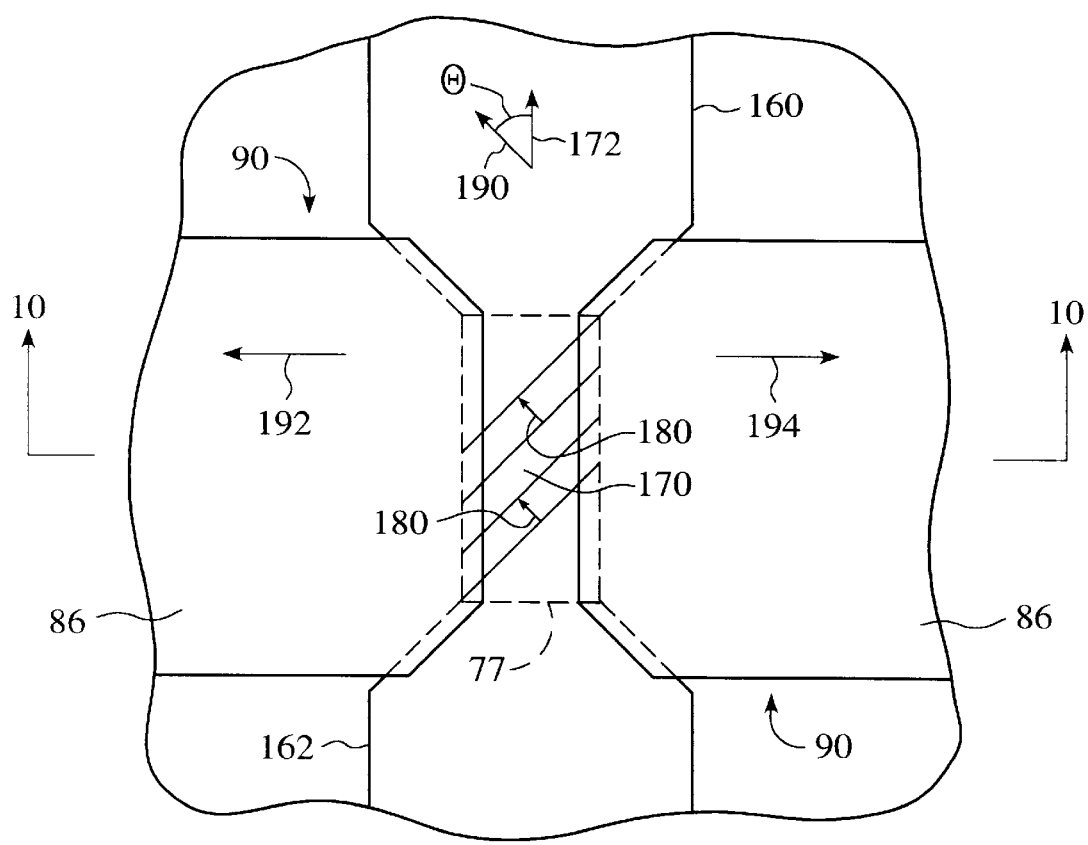
FIG. 9 is a top view of steps subsequent to those shown in FIG. 7 in forming an MR sensor in a laminated yoke.
Figure 10:
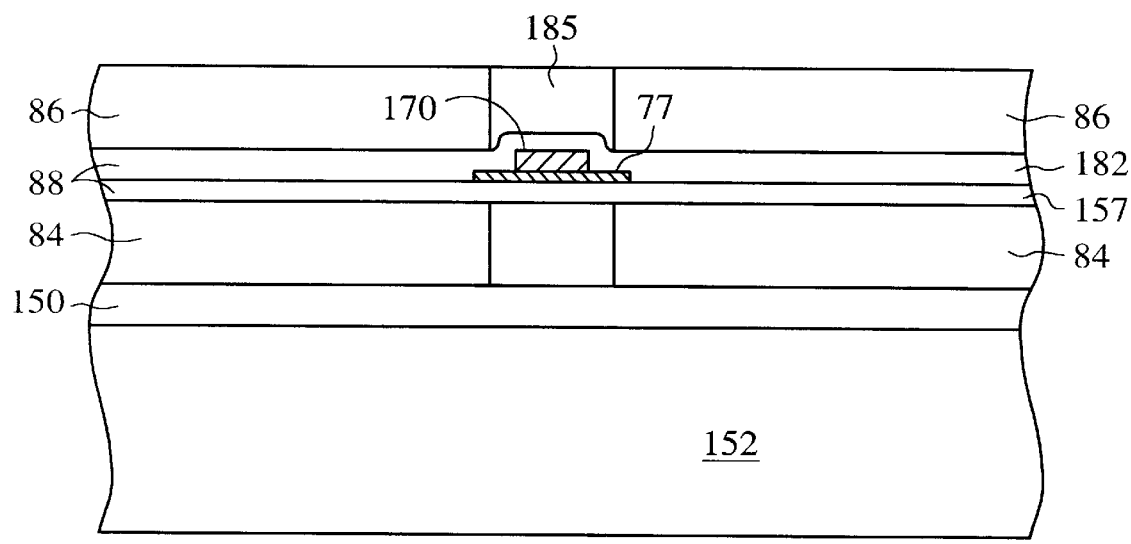
FIG. 10 is a cross-sectional view of the steps of FIG. 9.

An ultralight head 68 is seen in FIG. 3 and FIG. 4 to also have a body with a projection 70 for operational contact with a rigid disk surface, a magnetically permeable core 72 terminating in a pair of poletips 75 exposed at a tip of the projection and an MR sensor 77 coupled to the core opposite to the poletips. The arrows 3—3 in FIG. 4 indicate the cross sectional view of FIG. 3. Like the virtual contact head outlined above, the ultralight body is built in a series of thin-film layers atop a wafer substrate, the layers designed to be mostly parallel to a magnetic recording surface of a disk. Unlike the virtual contact head, however, the ultralight head is completely removed from the substrate to leave a body formed entirely of thin films. The ultralight head is also designed to have three projections or legs 70, 80 and 82 to stabilize contact with the disk during information storage or retrieval, and to avoid aerodynamic lift of even the leading edge of the chip.

A magnetically permeable core 72 shown in FIG. 3 has a similar shallow ribbon shape that loops around a coil layer 78 as the gently curved core 35 depicted in FIG. 1, but the core 72 shown in the ultralight head is laminated for improved high frequency performance. That is, a pair of approximately micron thick magnetically permeable layers 84 and 86 are separated by a thin nonmagnetic layer 88 along a generally flat first yoke, and a similar pair of magnetically permeable ribbons 92 and 94 are separated by a thin a magnetic layer 96 along a gently curving second yoke 98. The MR sensor 77 is a stripe that is parallel with layers 84 and 86 and disposed within a magnetic layer 88. The MR stripe 77 has a thickness of a few hundred angstroms and may be biased by a canted current conductor formation, a soft adjacent layer, a permanent magnet layer or exchange coupled layer, and is located between closely adjacent layers of the laminated core for improved efficiency. As with the previous embodiment, the efficiency of the planar transducer combined with contact or virtual contact between the magnetic core and the disk allows MR sensing without the use of a shunt. Since reading is performed with the MR sensor 77, only a single coil layer is used for writing, which mitigates thermal noise from the coil. The thermally conductive second yoke 98 diverts heat away from the MR sensor 77, while the various alumina layers disposed between the poletips 75 and the sensor 77 shield the sensor from thermal asperities from the head-disk interface.

FIG. 5 and FIG. 6 show an ultralight contact, integrated head and flexure beam 100 with a transducer 102 having an MR sensor 105 coupled to a magnetically permeable core 110 at a position opposed to that of a pair of poletips 112, the poletips being exposed at the end of a disk-facing projection 115. The arrows 5—5 in FIG. 6 indicate the cross sectional view of FIG. 5. The integrated head and flexure beam 100 is formed, like the ultralight head, on a substrate along with thousands of like beams, from which it is thereafter removed. A split coil layer 117 winds symmetrically around and through the core 110, with a pair of interconnects 119 providing leads to inner rings of the spiral coil 117, the interconnects providing a conductive link to a pair of write conductors 122 and 123 that extend along a side of the flexure beam 100. The MR sensor 105 is similarly connected to a pair of read conductors 124 and 125 that extend along an opposite side of the beam 100. The beam 100 has a tapered shape and is divided into a pair of hinge strips 127 and 130 which are connected by braces 133, 135 and 137. A mounting end 139 of the beam 100 has a void 140 which allows swage attachment to a baseplate without damage to the beam. Near the mounting end 139 conductors 122, 123, 124 and 125 are exposed at pads 142, 143, 144 and 145, respectively, for connection with drive system electronics. Substantially continuous contact of the head 100 with the disk as provided by this embodiment may help to mitigate thermal fluctuations caused by occasional contact.

A preferred construction of the laminated yoke MR sensor 77 utilizing canted current biasing is shown in FIGS. 7–10, which depict early steps in the process of forming the transducer. The arrows 7—7 in FIG. 8 indicate the cross sectional view of FIG. 7, while in FIG. 9 the arrows 10—10 indicate the cross sectional view of FIG. 10. Similarly, the arrows 8—8 in FIG. 7 indicate the cross sectional view of FIG. 8, while in FIG. 10 the arrows 9—9 indicate the cross sectional view of FIG. 9. The MR sensor 77 and magnetic layers 84 and 86 are formed of "permalloy" (approximately $Ni_{0.8}Fe_{0.2}$) layers which, although separated by the insulative layer 88 and gaps in the magnetic layers, are magnetically coupled to form the first yoke 90. Magnetically permeable yoke layer 84 is formed first, atop either an insulative layer 150 such as polished alumina or silicon nitride or, for the situation in which the wafer die will remain as part of the finished slider, optionally formed directly upon a wafer substrate 152 made of an insulative material such as alumina, silicon nitride or nonconductive silicon carbide. For ultralight embodiments such as were shown in FIGS. 3–6, a copper layer is typically formed between the wafer 152 and insulative layer 150 so that the transducers can be released from the wafer after they are built. The wafer 152 and/or the insulative layer 150 are traversed with electrical leads, not shown, to allow electrical connection between the transducer and drive electronics.

Magnetically permeable layer 84 has been formed by window frame plating to a thickness of several microns, with an a magnetic gap 155 in the layer 84 formed adjacent to sensor 77. To increase magnetic flux through that sensor, the gap is typically filled with an alumina layer that is polished along with magnetic layer 84 to leave each with a thickness between about 1 $\mu$m and 3 $\mu$m. The yoke layer 84 has an easy axis of magnetization shown by arrow 153 and can also be seen in FIG. 7 to be tapered adjacent to sensor 77, also in order to channel flux through the sensor. A thin layer 157 of alumina is then sputtered and polished to a thickness of approximately 250 Å–2000 Å, providing a smooth, contaminate free surface for forming the sensor. Forming the MR stripe 77 begins with sputtering a permalloy film to a thickness of about 200 Å, the film having an easy axis of magnetization generally parallel to that of layer 84 and double headed arrow 153. The film is then covered with a patterned photoresist and ion beam etched to define a generally rectangular stripe extending about 5 $\mu$m longitudinally and about 30 $\mu$m laterally, although the exact dimensions of the stripe may vary from these figures substantially, depending upon tradeoffs involved in maximizing efficiency and stability.

The IBE that defines the outline of the MR stripe 77 may simply remove a window frame shaped border around the stripe, leaving the remainder of the permalloy film as a seed layer for the magnetic layer 86 and a pair of conductive leads 160 and 162 that will be formed later. Alternatively, as shown, the IBE may remove all of the thin permalloy aside from the rectangular stripe 77. Next, a conductive pattern is formed which provides the leads 160 and 162 to the MR stripe 77, the leads having respective slanted edges 165 and 168 which are parallel with each other and with edges of a parallelogram shaped conductive bar 170 formed therebetween. A bias layer formed of a permanent magnet or an antiferromagnetic material such as FeMn optionally underlies the conductive pattern adjoining the MR stripe 77, in order to pin the magnetization of that stripe in the direction of arrow 172. The leads 160 and 162 and conductive bar 170 are so much more electrically conductive than the MR stripe 77 that an electrical current between leads 160 and 162 in sections 177 of the MR stripe not adjoining leads 160 and 162 or bar 170 flows along the shortest path between the slanted edges 165 and 168 and bars as shown by arrows 180, essentially perpendicular to those edges and the parallel sides of the intervening bar 170 and at a slant to the easy axis direction 172.

An amagnetic, insulative and preferably alumina layer 182 is sputtered to a thickness of approximately 100 Å–1000 Å on top of the MR stripe 77, conductive leads 160 and 162, conductive bar 170 and alumina layer 157, so that adjoining alumina layers 157 and 182 together form the thin a magnetic layer 88 that separates magnetic layers 84 and 86 for improved high frequency performance. Magnetic layer 86 is then formed atop alumina layer 182 by sputtering a NiFe seed layer and window frame plating to leave a magnetically permeable layer 86 adjacent to and shaped like layer 84, which together with stripe 77 forms the first yoke 90. Layer 86, like layer 84, tapers toward a gap adjacent to MR stripe 77, so that magnetic flux from the layers 84 and 86 is encouraged to pass through MR stripe 77. Another alumina layer 185 is then deposited atop the wafer, filling the gap in layer 86, after which the wafer is polished flat to the point at which layer 86 has generally the same thickness as layer 84.

The magnetoresistance of the MR stripe 77 varies depending upon an angle θ between the magnetic field and the electric current in the stripe such that the resistance is generally proportional to $\cos^2\theta$. The direction of electric current in stripe 77 is held constant as shown by arrow 190, which is parallel to current arrows 180, while the direction of magnetization can change depending upon the flux in the yoke 90. In the absence of a magnetic field from the yoke layers 84 and 86, the angle θ between the easy axis 172, along which the magnetization of the stripe 77 is directed, and the direction of electric current in magnetoresistive sections 177 as shown by arrow 190, is between 0° and 90° and preferably near 45°. Upon receiving a magnetic signal from a disk by a pair of poletips coupled to the yoke layers 84 and 86, so that a magnetic flux in those sections is directed as shown by arrows 192, the magnetic moment of the stripe 77 is rotated in a direction more parallel with current arrows 180 so that the magnetoresistance in sections 177 approaches zero. On the other hand, when a magnetic pattern on the disk creates a magnetic flux in the yoke layers 84 and 86 in a direction of arrow 194, the magnetic moment within MR stripe 77 is rotated to become more nearly perpendicular to current direction 180 within resistive sections 177, so that magnetoresistance in those sections 177 rises. This differential resistance based upon the direction of magnetic flux in yoke layers 84 and 86 creates a voltage difference which is used to read the information from the disk. Alternatively, the MR sensor could be formed with a soft adjacent layer (SAL) or other known bias schemes, or could instead be a spin-valve, giant magnetoresistive (GMR) or multilayered, colossal magnetoresistive sensor using techniques known to those skilled in the art.

Figure 11:
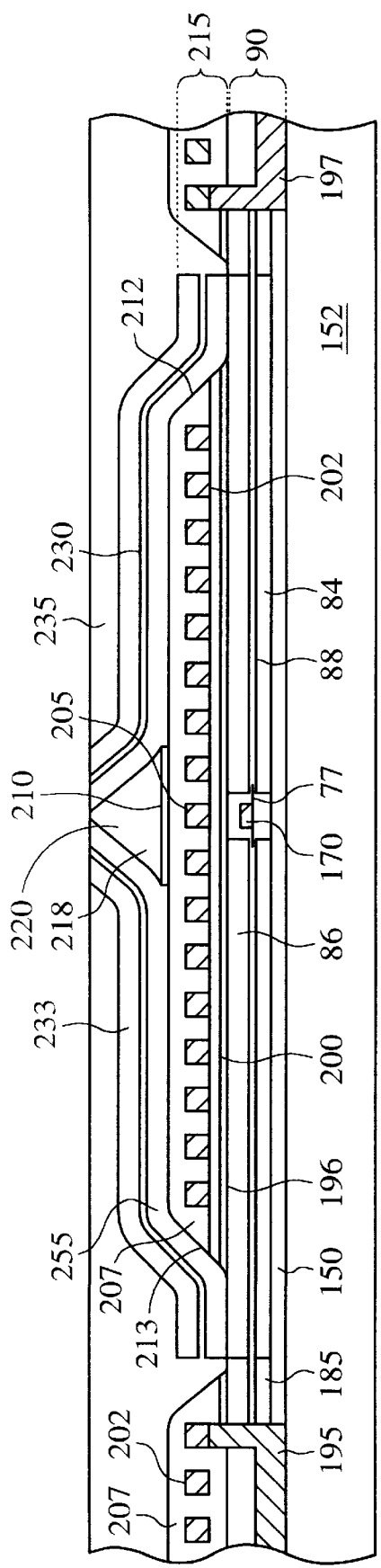
FIG. 11 is a cross-sectional view of steps of forming a coil and gently curving laminated yoke coupled to the yoke of FIG. 9.

As is apparent in the broader view of FIG. 11, during the previously described formation of first yoke 90 and sensor 77 a pair of conductive leads 195 and 197 have been concomitantly formed in segments to provide electrical current through a soon to be described transducer coil used for writing. A silicon carbide etch stop layer 196 is sputtered to a thickness of a few thousand angstroms atop yoke layer 86, alumina layer 185 and lead 195, after which lead 195 is exposed by IBE. An extension of lead 195 is then plated through a hole in a photoresist exposing that lead, after which the resist is removed and another alumina layer 200 is sputtered and lapped flat to a thickness of a few microns on top of etch stop 196. A NiFeMo or Ti/Cu seed layer is then sputtered, then covered with another photoresist layer which is patterned with a pair of oppositely circling spirals that are connected at a crossover winding adjacent to sensor 77, and then electroplated with copper to form a coil layer 202, which is connected with the lead 195. The patterned spiral resist is then removed as is the seed layer between coils, to leave the coil layer 202 which spirals outwardly from leads 195 and 197 to meet at crossover winding 205. A layer 207 of alumina is deposited on and about the coil 202, then lapped flat to leave a few microns atop the coil. An etch-stop layer 210 of SiC is then deposited to cover alumina layer 207, masked and patterned by IBE to remain atop the coil spirals 202, for protection during isotropic etching of a later formed alumina layer 218, the etching creating a sloping pedestal 220.

Figure 12:
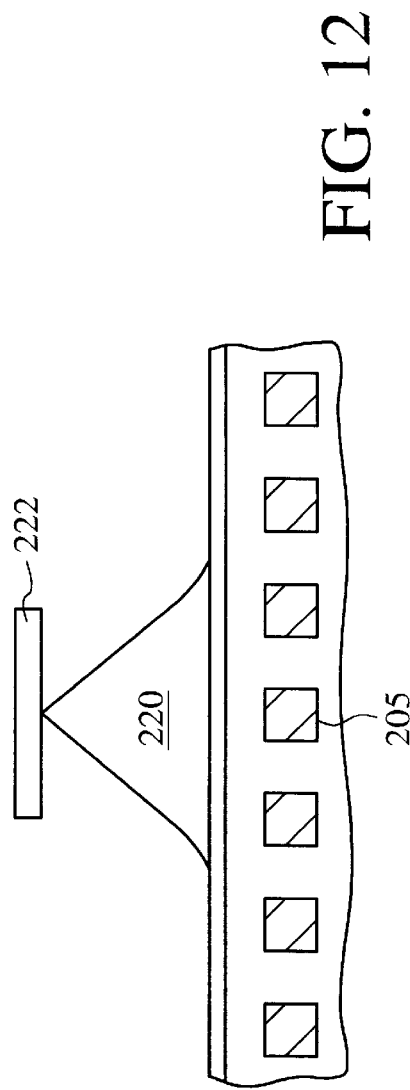
FIG. 12 is a cross-sectional view of the formation of a pedestal for the gently curving yoke of FIG. 11.

FIG. 12 details the pedestal creation, in which alumina layer 218 is formed on top of etch-stop 210, the alumina layer polished and covered with a MoNiFe cap 222 adjacent to crossover winding 205, so that isotropic chemical etching of that alumina layer 218 forms the pedestal 220 with sloping sides, after which the cap and the etch-stop 210 not covered by pedestal 220 are removed. Apertures in a photoresist are then formed over the ends of yoke 90, allowing another isotropic etch to produce the sloping sides 212 and 213 adjacent to the ends of yoke 90 and above etch stop 196. This etch stop 196 may then be removed from the bottom between the sloping sides by IBE or RIE. A first gently curving yoke layer 225 of NiFe is then formed by window frame plating, the sloping sides 212 and 213 allowing the ends of that layer to adjoin the ends of yoke 90, while projecting away from sensor 77 atop the pedestal 220. A thin, a magnetic layer of alumina 230 is then sputtered on the yoke layer 225, after which a second gently curving yoke layer 233 is window frame plated atop the first 225, separated by the thin a magnetic layer 230 to form an efficient, gently curving second yoke 215. Another alumina layer 235 is deposited on second yoke 215 and then lapped along with the portion of yoke 215 projecting above the pedestal 220 until yoke layer 225 is separated into two sections over the pedestal, with a gap between the sections.

Figure 13:
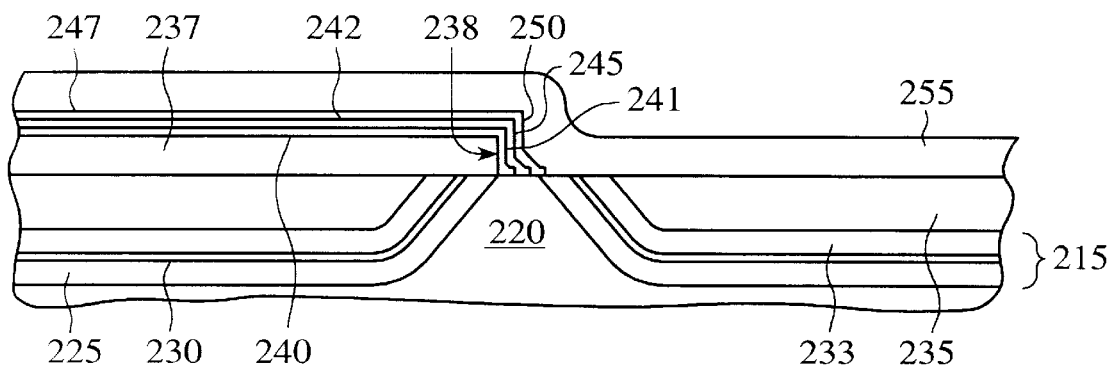
FIG. 13 is a cross-sectional view of the formation of poletip and gap layers adjoining the yoke of FIG. 11.

FIG. 13 shows the formation of a pair of poletips atop the separated second yoke 215, beginning with the window frame plating of permalloy or other magnetically permeable material to form a first pole layer 237, preferably of NiFe, leaving an essentially vertical edge 238 disposed over the gap in the yoke 215. A thin (approximately 2000 Å) layer 240 of high magnetic saturation (high $B_S$) material such as FeAl(N) is then sputtered over pole layer 237 and edge 238 and then photomasked and trimmed by IBE to avoid connecting the separated sections of yoke layer 215 with a high $B_S$ path, leaving a vertical high $B_S$ section 241. A thin layer 242 of a magnetic material such as hydrogenated carbon, SiC or Si is then similarly deposited, creating an essentially vertical section 245 formed adjacent to the edge 238, which will become an a magnetic gap between the poletips. Although the section 245 of a magnetic material that will become the gap is formed on essentially vertical sides of the pole and high $B_S$ layers 238 and 241 that may be at least several microns in height, a uniform thickness of the high $B_S$ section 241 adjoining edge 238 and gap section 245 are formed by sputtering in a vacuum chamber while positioning the platform holding the wafer on which the transducers are being formed such that the sputtered material impinges upon the edge 238 of the pole layer 237 as well as the top of that layer. This uniform formation on a vertical edge can be accomplished by rotating or transporting the wafer across the base of the sputtering chamber, or simply by positioning the wafer at a location at which the sputtering material as an angled approach. The a magnetic layer 242 is then trimmed, leaving gap section 245. A second high $B_S$ layer 247 is then sputtered over the previously formed layers to form, in part, another essentially vertical high $B_S$ section 250, the layer 247 then optionally masked and etched by IBE along the mask edge so that the vertical section 250 is connected to the yoke 215. A second pole layer 255 is formed by window frame plating or sheet plating, after which the wafer is lapped flat, exposing first pole layer 237 and tips of the gap 245 and high $B_S$ sections 250 covering a magnetic layer 150 and alumina layer 144. The dimensions of the vertical gap 245 that face a disk will set the magnetic resolution during communication between the transducer and conventional longitudinal media, the width of the gap 245 being uniform and typically between about 0.05 µm and 0.4 µm, and preferably about 0.20 µm currently.

Figure 14:
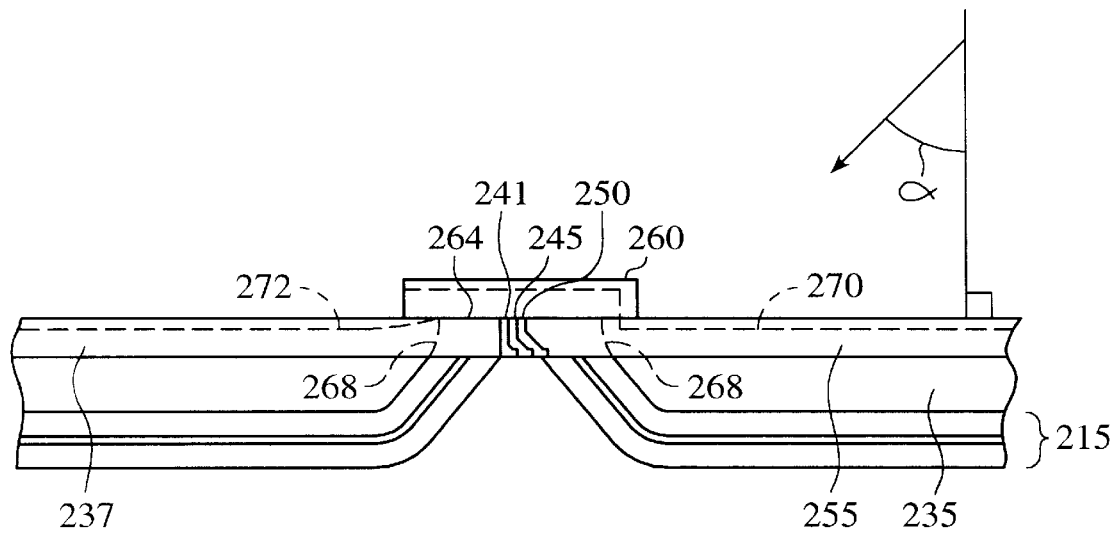
FIG. 14 is a cross-sectional view of the etching of the poletip layers of FIG. 13.
Figure 15:
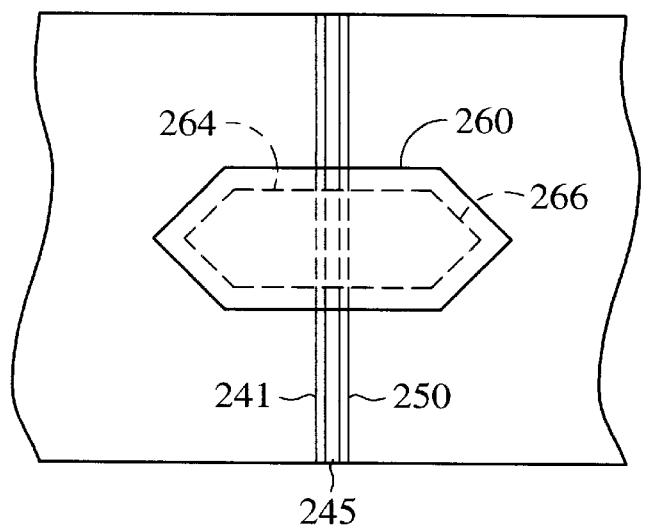
FIG. 15 is a top view of the etching of the poletip layers of FIG. 13.

Referring now to FIG. 14 and FIG. 15, a photoresist mask 260 has been formed in an elongated hexagonal shape desired for a pair of poletips 264 and 266, however, the mask 260 is larger than the eventual poletip area, to compensate for removal of a portion of the mask during etching. The etching is done by IBE with the ion beam directed at a preselected angle α to the surface of the pole layers 237 and 255, while the wafer is rotated, in order to form vertical sides of the poletips 264 and 266. This angled, rotating IBE also forms a tapered skirt 268 of the poletips 264 and 266, the skirt 268 acting as an aid to the subsequent formation of the DLC that will surround the poletips, since the absence of an acute, shadowed corner mitigates formation of weakened regions in the DLC which tend to crack. The vertical sides of the poletips 264 and 266 allows operational wear of the poletips to occur without changing the magnetic track width of the head. On the other hand, the skirt 268 allows the DLC that wraps around the poletips 264 and 266 to be formed without cracks or gaps which can occur, for example, in depositing DLC by plasma enhanced chemical vapor deposition (PECVD) onto a vertically etched pair of poletips. Although this tapered skirt 268 can be achieved by a variety of techniques, an angled, rotating IBE is preferred that exactingly tailors both the vertical poletips 264 and 266 and tapered skirts 268.

As shown in FIG. 14, the photoresist mask 260 has an etch rate that is similar to that of the NiFe pole layers 237 and 255, so that when the angle α is approximately 45° the pole layer 255 and the mask 260 are etched a similar amount, as shown by dashed line 270. Pole layer 237, however, is partially shielded from the angled IBE by the mask 260, so that a portion of layer 237 that is adjacent to the mask is not etched, while another portion is etched as shown by dashed line 272. As the wafer substrate is rotated during etching, layer 255 will have a non-etched portion adjacent to an opposite end of the elongated mask 260, as will areas adjacent to the sides of the elongated mask. The angle a may be changed to further control the shaping of the poletips 264 and 266, for example to employ a greater angle such as about 60° toward the end of the IBE. This rotating, angled IBE is continued for an appropriate time to create a pair of poletips 264 and 266 having vertical sides with a tapered skirt 268 and a flat, elongated hexagonal top centered about the gap 245.

Figure 16:
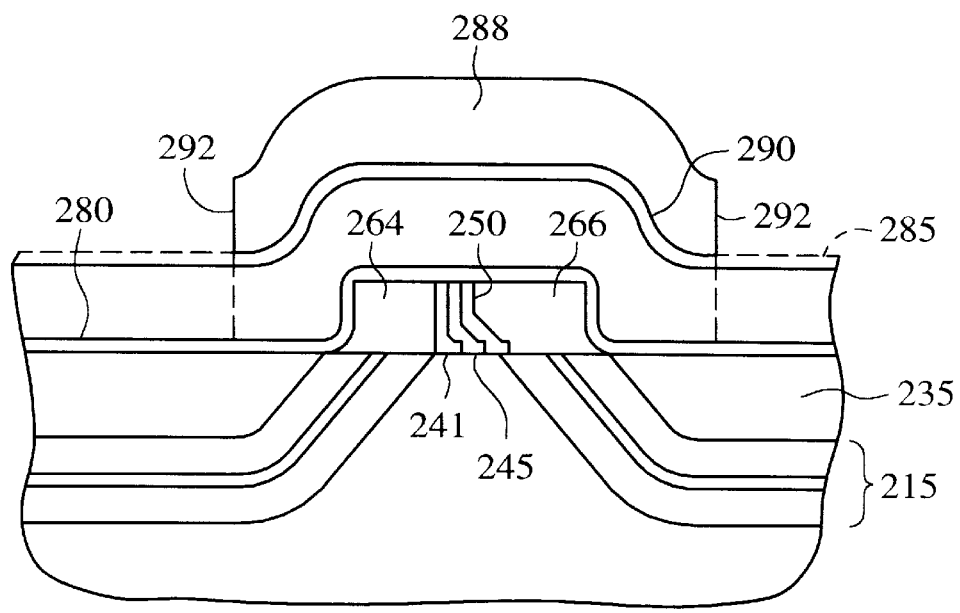
FIG. 16 is a cross-sectional view of the creation of a durable pad encasing the poletips of FIG. 14.

The wafer and multiple transducers are then ready for the formation of the disk-facing surface of each transducer, including features such as the trailing pad 40 and air bearing pad 58 of the virtual-contact embodiment, the triad of pads 70, 80 and 82 of the ultralight-contact slider, or the unitary projection 115 of the ultralight-contact, integrated flexure head. Since each embodiment has a pad or projection encompassing the poletips, FIG. 16 focuses on the formation of such a magnetically active pad for clarity. An adhesion layer 280 of Si is deposited to a thickness of about 1000 Å atop the poletips 264 and 266 and alumina layer 235. A layer 282 of DLC is then deposited by PECVD onto the adhesion layer 280. An approximately 1500 Å thick layer 285 of NiFe is then sputter deposited, which is then patterned by IBE with a lithographically defined photoresist mask 288 to leave, after IBE, a NiFe mask 290 disposed over the DLC covered poletips 264 and 266. The DLC layer 282 covered with the NiFe masks is then RIE etched along edges 292 with $O_2$ plasma to leave projections 295 of DLC that encase the poletips, with any other disk-facing projections also being formed at this time. The pads 295 are then lapped to expose the poletips 264 and 266. The heads are now divided from each other by either dicing of the wafer to yield virtual-contact heads or chemically dissolving the release layer to yield ultralight-contact heads.

What is claimed is:

1. A head for a rigid disk drive comprising:
 a body having a series of adjoining solid layers bounded by disk-facing and non-disk-facing major surfaces, with a plurality of said layers being oriented substantially parallel to said surfaces and wherein said disk-facing surface has a plurality of microscopic projections, said layers forming a magnetic circuit and an electrical circuit, said magnetic circuit having a pair of poletips exposed on a substantially flat end of one of said projections and separated by a submicron nonmagnetic gap, wherein said electrical circuit shares a magnetoresistive element with said magnetic circuit at a part of said magnetic circuit adjacent to said non-disk-facing surface, and said magnetic circuit includes a plurality of magnetically permeable layers separated by a nonmagnetic layer having a thickness less than that of said magnetically permeable layers and oriented generally parallel to said magnetically permeable layers, wherein said magnetoresistive element is generally aligned with said nonmagnetic layer.

2. The head of claim 1 wherein said magnetic circuit extends substantially further in a direction parallel than a direction perpendicular to said disk-facing surface.

3. The head of claim 1 and further comprising an electrical coil inductively coupled to said magnetic circuit and disposed between said magnetoresistive element and said poletips.

4. The head of claim 1 wherein said magnetic circuit has a substantially flat section disposed adjacent to said non-disk-facing surface and a curved section extending toward said poletips from said flat section.

5. The head of claim 1 wherein said magnetic circuit has a plurality of curved magnetically permeable layers forming a magnetically coupled loop.

6. The head of claim 1 wherein at least one of said poletips is in dynamic contact with a disk amid data retrieval.

7. The head of claim 1 wherein said magnetoresistive element is insulated from thermal asperities present at said end of said projection.

8. A head for a rigid disk drive, the head comprising:
 a substantially inflexible body having a series of adjoining solid layers forming a magnetic circuit coupled with an electrical write circuit and an electrical read circuit, said magnetic circuit including a laminated yoke having a submicron nonmagnetic layer separating a plurality of thicker, magnetically permeable layers disposed generally parallel to said nonmagnetic layer and coupled across said nonmagnetic layer with substantially parallel magnetizations, said electrical write circuit including a coil inductively coupled to said yoke, and said electrical read circuit including a magnetoresistive element disposed in said nonmagnetic layer, such that said magnetoresistive layer senses a magnetization of said magnetically permeable layers.

9. The head of claim 8, wherein said magnetically permeable layers are substantially parallel with said magnetoresistive element and with a disk-facing surface of said body.

10. The head of claim 9 wherein said magnetic circuit includes a pair of poletips separated by a submicron nonmagnetic gap and exposed on a protuberance of said disk-facing surface.

11. The head of claim 9 wherein said coil is disposed between said magnetoresistive element and said disk-facing surface.

12. The head of claim 9 wherein said magnetoresistive element is disposed adjacent to a gap in said magnetically permeable layers.

13. The head of claim 9 wherein said magnetic circuit is disposed in dynamic contact with a rigid disk amid information retrieval.

14. The head of claim 9 wherein said laminated yoke includes a gently curving section.

15. A transducer for a rigid disk drive system, the transducer comprising:

a body containing a plurality of magnetically permeable layers including first and second substantially ribbon-shaped yokes magnetically coupled as a loop, said first yoke terminating at a pair of data transmissive poletips which are separated by a submicron a magnetic gap, a magnetoresistive element magnetically coupled to said second yoke distal to said first yoke and connected to a pair of sense leads, and a conductive coil passing between and inductively coupled to said yokes and having ends connected to a pair of write leads, wherein said coil is disposed between said magnetoresistive element and said poletips, and at least one of said poletips dynamically contacts the disk during communication, wherein at least one of said yokes includes a plurality of elongated magnetic strips separated by an elongated a magnetic strip having a thickness much less than that of said magnetic strips, and said magnetoresistive element is disposed adjoining said a magnetic strip and adjacent to said magnetic strips.

16. The transducer of claim 15, wherein said poletips are adapted for sliding while communicating with media.

17. The transducer of claim 15, wherein said first yoke includes a plurality of magnetically permeable ribbons sandwiched about a thinner amagnetic layer.

18. The transducer of claim 15, wherein said magnetoresistive element is coupled to said strips.

19. A transducer for a drive system having a rapidly spinning, rigid disk comprising:

a body composed of a series of adjoining solid layers with a disk-facing surface substantially parallel to a plurality of said layers and having a plurality of projections contacting the spinning disk, said body containing a magnetically permeable core including a poletip terminating substantially coextensively with a disk-facing end of one of said projections, an electrically conductive coil inductively coupled to said core, and a magnetoresistive read element magnetically coupled to said core and separated from said poletip by thermally protective material, whereby said poletip is in virtual contact with the spinning disk and said read element is isolated from thermal noise generated by said contact, wherein said core includes a plurality of lamina separated by a submicron a magnetic layer, and at least a part of said read element is disposed between said lamina and adjoining said a magnetic layer.

* * * * *